US009649999B1

(12) United States Patent
Amireddy et al.

(10) Patent No.: US 9,649,999 B1
(45) Date of Patent: May 16, 2017

(54) VEHICLE REMOTE OPERATIONS CONTROL

(71) Applicant: Sprint Communications Company L.P., Overland Park, KS (US)

(72) Inventors: Sridhar Reddy Amireddy, Overland Park, KS (US); David A. Haugh, Olathe, KS (US); Alex J. Oyler, Kansas City, MO (US); Joshua D. Turner, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 63 days.

(21) Appl. No.: 14/698,522

(22) Filed: Apr. 28, 2015

(51) Int. Cl.
| | | |
|---|---|---|
| *G05D 1/00* | (2006.01) | |
| *G05D 3/00* | (2006.01) | |
| *G06F 7/00* | (2006.01) | |
| *G06F 17/00* | (2006.01) | |
| *B60R 16/023* | (2006.01) | |
| *H04W 4/14* | (2009.01) | |
| *E05F 15/77* | (2015.01) | |

(52) U.S. Cl.
CPC ............ *B60R 16/023* (2013.01); *E05F 15/77* (2015.01); *H04W 4/14* (2013.01)

(58) Field of Classification Search
CPC .................................. E05F 15/77; H04W 4/14
USPC ............................................................ 701/2
See application file for complete search history.

(56) References Cited

U.S. PATENT DOCUMENTS

| | | | |
|---|---|---|---|
| 5,892,900 | A | 4/1999 | Ginter et al. |
| 6,622,083 | B1 | 9/2003 | Knockeart et al. |
| 7,209,964 | B2 | 4/2007 | Dugan et al. |
| 7,366,892 | B2 | 4/2008 | Spaur et al. |
| 7,376,392 | B2 | 5/2008 | Myojo |
| 7,454,473 | B2 | 11/2008 | Suzuki |
| 7,912,224 | B2 | 3/2011 | Lee et al. |
| 7,949,375 | B2 | 5/2011 | Kortge |
| 7,966,111 | B2 | 6/2011 | Moinzadeh et al. |

(Continued)

FOREIGN PATENT DOCUMENTS

| | | |
|---|---|---|
| DE | 102011112540 A1 | 4/2012 |
| JP | 20062441 | 9/2006 |

(Continued)

OTHER PUBLICATIONS

Belkin, Wireless Network Access Point User Manual, published by Belkin Corporation, 2003, pp. 1-36.

(Continued)

*Primary Examiner* — Maceeh Anwari

(57) ABSTRACT

A head unit for a motor vehicle. The head unit comprises a processor, a memory, a radio frequency transceiver, a backup camera application, a navigation application, a remote operations event handling application stored in the memory that handles remote operation commands received via the radio frequency transceiver, and a boot-loader application. When executed by the processor the boot-loader application causes the processor to initiate execution of the remote operations event handling application and, after causing the processor to initiate execution of the remote operations event handling application, causes the processor to initiate execution of the backup camera application and execution of the navigation application.

19 Claims, 9 Drawing Sheets

(56) References Cited

U.S. PATENT DOCUMENTS

| | | |
|---|---|---|
| 8,271,050 B2 | 9/2012 | Weiss |
| 8,417,823 B2 | 4/2013 | Luna et al. |
| 8,457,686 B2 | 6/2013 | Przybylski |
| 8,484,707 B1 | 7/2013 | Bertz et al. |
| 8,527,164 B2 | 9/2013 | Staudinger et al. |
| 8,548,532 B1 | 10/2013 | Ng |
| 8,606,335 B2 | 12/2013 | Ozaki |
| 8,626,152 B2 | 1/2014 | Farrell et al. |
| 8,630,747 B2 | 1/2014 | Burcham et al. |
| 8,676,199 B2 | 3/2014 | Madhavan et al. |
| 8,750,942 B1 | 6/2014 | Ng |
| 8,787,949 B2 | 7/2014 | Sumcad et al. |
| 8,918,244 B2 | 12/2014 | Brzezinski et al. |
| 8,994,591 B2 | 3/2015 | Dupray et al. |
| 9,002,574 B2 | 4/2015 | Garrett et al. |
| 9,031,498 B1 | 5/2015 | Bertz et al. |
| 9,032,547 B1 | 5/2015 | Hohler et al. |
| 9,110,774 B1 | 8/2015 | Bonn et al. |
| 9,173,238 B1 | 10/2015 | Bloomcamp et al. |
| 9,252,951 B1 | 2/2016 | Katzer et al. |
| 9,398,454 B1 | 7/2016 | Burcham et al. |
| 9,439,240 B1 | 9/2016 | Shipley et al. |
| 9,444,892 B1 | 9/2016 | Amireddy et al. |
| 2001/0042107 A1 | 11/2001 | Palm |
| 2003/0066884 A1 | 4/2003 | Reddy et al. |
| 2003/0096641 A1 | 5/2003 | Odinak |
| 2003/0120601 A1 | 6/2003 | Ouye et al. |
| 2003/0224840 A1 | 12/2003 | Frank et al. |
| 2004/0044585 A1 | 3/2004 | Franco |
| 2004/0083041 A1 | 4/2004 | Skeen et al. |
| 2004/0125957 A1 | 7/2004 | Rauber et al. |
| 2004/0157650 A1 | 8/2004 | Wissinger et al. |
| 2005/0021744 A1 | 1/2005 | Haitsuka et al. |
| 2005/0027438 A1 | 2/2005 | Rockett et al. |
| 2005/0065779 A1 | 3/2005 | Odinak |
| 2005/0113102 A1 | 5/2005 | Kwon et al. |
| 2006/0059480 A1 | 3/2006 | Kimoto |
| 2006/0087971 A1 | 4/2006 | Kim et al. |
| 2006/0143463 A1 | 6/2006 | Ikeda et al. |
| 2006/0154659 A1 | 7/2006 | Roter et al. |
| 2006/0168578 A1 | 7/2006 | Vorlicek |
| 2007/0028220 A1 | 2/2007 | Miller et al. |
| 2007/0047466 A1 | 3/2007 | Todokoro |
| 2007/0086579 A1 | 4/2007 | Lorello et al. |
| 2007/0113269 A1 | 5/2007 | Zhang |
| 2007/0124043 A1 | 5/2007 | Ayoub et al. |
| 2007/0124045 A1 | 5/2007 | Ayoub et al. |
| 2007/0124046 A1 | 5/2007 | Ayoub et al. |
| 2007/0160199 A1 | 7/2007 | Sekiguchi et al. |
| 2007/0288423 A1 | 12/2007 | Kimoto |
| 2008/0021633 A1* | 1/2008 | Naito ............... G01C 21/005 701/532 |
| 2008/0034126 A1 | 2/2008 | Baker |
| 2008/0072047 A1 | 3/2008 | Sarikaya et al. |
| 2008/0148374 A1 | 6/2008 | Spaur et al. |
| 2008/0162676 A1 | 7/2008 | Magnusson |
| 2008/0289018 A1 | 11/2008 | Kawaguchi |
| 2008/0289044 A1 | 11/2008 | Choi |
| 2008/0307086 A1 | 12/2008 | Brooks et al. |
| 2009/0028082 A1 | 1/2009 | Wynn et al. |
| 2009/0049119 A1 | 2/2009 | Marcinkiewicz et al. |
| 2009/0109941 A1 | 4/2009 | Carter |
| 2009/0217036 A1 | 8/2009 | Irwin et al. |
| 2009/0265278 A1 | 10/2009 | Wang et al. |
| 2009/0287499 A1 | 11/2009 | Link, II |
| 2010/0054219 A1 | 3/2010 | Humblet et al. |
| 2010/0097239 A1 | 4/2010 | Campbell et al. |
| 2010/0136944 A1 | 6/2010 | Taylor et al. |
| 2010/0197362 A1 | 8/2010 | Saitoh et al. |
| 2010/0220250 A1* | 9/2010 | Vanderwall ............ G01C 11/02 348/837 |
| 2010/0234071 A1 | 9/2010 | Shabtay et al. |
| 2010/0235285 A1 | 9/2010 | Hoffberg |
| 2010/0245122 A1 | 9/2010 | Haralson et al. |
| 2010/0260350 A1 | 10/2010 | Chutorash et al. |
| 2010/0285787 A1 | 11/2010 | Matsuda |
| 2011/0009107 A1 | 1/2011 | Guba et al. |
| 2011/0086668 A1 | 4/2011 | Patel |
| 2011/0090908 A1 | 4/2011 | Jacobson et al. |
| 2011/0098044 A1 | 4/2011 | Aoyagi |
| 2011/0099316 A1 | 4/2011 | Tseng et al. |
| 2011/0111728 A1 | 5/2011 | Ferguson et al. |
| 2011/0252415 A1 | 10/2011 | Ricci |
| 2011/0257973 A1 | 10/2011 | Chutorash et al. |
| 2011/0263293 A1 | 10/2011 | Blake et al. |
| 2011/0295444 A1 | 12/2011 | Westra et al. |
| 2011/0310731 A1 | 12/2011 | Park et al. |
| 2012/0028597 A1 | 2/2012 | Chmielewski et al. |
| 2012/0028607 A1 | 2/2012 | Tengler et al. |
| 2012/0028656 A1 | 2/2012 | Yi et al. |
| 2012/0109406 A1 | 5/2012 | Yousefi et al. |
| 2012/0127139 A1 | 5/2012 | Hayami et al. |
| 2012/0134497 A1 | 5/2012 | Roitshtein et al. |
| 2012/0142367 A1 | 6/2012 | Przybylski |
| 2012/0159638 A1 | 6/2012 | McDade, Sr. |
| 2012/0167071 A1 | 6/2012 | Paek |
| 2012/0183221 A1 | 7/2012 | Alasry et al. |
| 2012/0203557 A1 | 8/2012 | Odinak |
| 2012/0282895 A1 | 11/2012 | Bai et al. |
| 2012/0324046 A1 | 12/2012 | Park |
| 2013/0082820 A1 | 4/2013 | Tieman |
| 2013/0205026 A1 | 8/2013 | Ricci |
| 2013/0218400 A1 | 8/2013 | Knoop et al. |
| 2013/0226391 A1 | 8/2013 | Nordbruch et al. |
| 2013/0297456 A1 | 11/2013 | Annan et al. |
| 2014/0053261 A1 | 2/2014 | Gupta et al. |
| 2014/0068010 A1 | 3/2014 | Nicholson et al. |
| 2014/0087760 A1 | 3/2014 | Bennett |
| 2014/0128047 A1 | 5/2014 | Edwards et al. |
| 2014/0130036 A1 | 5/2014 | Gurikar et al. |
| 2014/0143354 A1 | 5/2014 | Tiernan |
| 2014/0222298 A1 | 8/2014 | Gurin |
| 2014/0222910 A1 | 8/2014 | Petersen et al. |
| 2014/0336919 A1 | 11/2014 | Li et al. |
| 2015/0288636 A1* | 10/2015 | Yalavarty ............... H04L 51/16 709/206 |
| 2016/0098870 A1 | 4/2016 | Bergerhoff et al. |

FOREIGN PATENT DOCUMENTS

| | | |
|---|---|---|
| WO | WO2013166418 A2 | 11/2013 |
| WO | WO2013173331 A1 | 11/2013 |

OTHER PUBLICATIONS

Office Action dated Jan. 13, 2016, U.S. Appl. No. 13/218,503, filed Aug. 26, 2011.

Final Office Action dated Mar. 10, 2016, U.S. Appl. No. 13/463,799, filed May 3, 2012.

First Action Interview Pre-Communication dated Jan. 29, 2016, U.S. Appl. No. 13/455,121, filed Apr. 24, 2012.

Notice of Allowance dated Mar. 11, 2016, U.S. Appl. No. 13/455,121, filed Apr. 24, 2012.

Final Office Action dated Mar. 8, 2016, U.S. Appl. No. 14/034,475, filed Sep. 23, 2013.

Restriction Requirement dated Jan. 29, 2016, U.S. Appl. No. 14/703,997, filed May 5, 2015.

Amireddy, Sridhar Reddy, et al., Patent Application entitled, "Network Event Management Support for Vehicle Wireless Communication," filed May 5, 2015, U.S. Appl. No. 14/703,997.

Amireddy, Sridhar Reddy, et al., Patent Application entitled, "Vehicle Telematics Unit Communication Authorization and Authentication and Communication Service Provisioning," filed Aug. 8, 2015, U.S. Appl. No. 14/819,425.

Notice of Allowance dated Jun. 12, 2015, U.S. Appl. No. 13/769,268, filed Feb. 15, 2013.

First Action Interview Pre-Communication dated Jul. 9, 2015, U.S. Appl. No. 14/034,475, filed Sep. 23, 2013.

Restriction Requirement dated Feb. 24, 2015, U.S. Appl. No. 14/304,861, filed Jun. 13, 2014.

(56) References Cited

OTHER PUBLICATIONS

Office Action dated Jun. 30, 2015, U.S. Appl. No. 14/304,861, filed Jun. 13, 2014.
Restriction Requirement dated Sep. 4, 2015, U.S. Appl. No. 13/455,121, filed Apr. 24, 2012.
Katzer, Robin D., "Vehicle Key Function Control From a Mobile Phone Based on Radio Frequency Link From Phone to Vehicle," filed Jun. 13, 2014, U.S. Appl. No. 14/304,861.
Aboda, B., et al., "Exentsible Authentication Protocol (EAP)", Network Working Group, RFC 3748, Standards Track, Jun. 2004.
Foreign Communication From a Related Counterpart Application, International Search Report and Written Opinion dated Jun. 13, 2013, PCT/US13/40940 filed on May 14, 2013.
Foreign Communication From a Related Counterpart Application, International Preliminary Report on Patentability dated Nov. 27, 2014, PCT/US13/40940 filed on May 14, 2013.
Foreign Communication From a Related Counterpart Application, International Search Report and Written Opinion dated Dec. 23, 2013, PCT/US13/39514 filed on May 3, 2013.
Foreign Communication From a Related Counterpart Application, International Preliminary Report on Patentability dated Nov. 13, 2014, PCT/US13/39514 filed on May 3, 2013.
First Action Interview Pre-Communication dated Aug. 21, 2012, U.S. Appl. No. 13/218,503, filed Aug. 26, 2011.
First Action Interview Office Action dated Jan. 3, 2013, U.S. Appl. No. 13/218,503, filed Aug. 26, 2011.
Final Office Action dated May 7, 2013, U.S. Appl. No. 13/218,503, filed Aug. 26, 2011.
Advisory Action dated Aug. 1, 2013, U.S. Appl. No. 13/218,503, filed Aug. 26, 2011.
Office Action dated Feb. 5, 2014, U.S. Appl. No. 13/218,503, filed Aug. 26, 2011.
Final Office Action dated Jun. 16, 2014, U.S. Appl. No. 13/218,503, filed Aug. 26, 2011.
Advisory Action dated Sep. 26, 2014, U.S. Appl. No. 13/218,503, filed Aug. 26, 2011.
Office Action-Restriction Requirement dated May 7, 2014, U.S. Appl. No. 13/094,494, filed Apr. 26, 2011.
Office Action dated Aug. 28, 2014, U.S. Appl. No. 13/094,494, filed Apr. 26, 2011.
Notice of Allowance dated Dec. 3, 2014, U.S. Appl. No. 13/094,494, filed Apr. 26, 2011.
First Action Interview Pre-Interview Communication dated Oct. 26, 2012, U.S. Appl. No. 13/156,438, filed Jun. 9, 2011.
Notice of Allowance dated Feb. 26, 2013, U.S. Appl. No. 13/156,438, filed Jun. 9, 2011.
First Action Interview Pre-Communication dated Jan. 31, 2012, U.S. Appl. No. 13/246,554, filed Sep. 27, 2011.
FAIPP Office Action dated May 21, 2012, U.S. Appl. No. 13/246,554, filed Sep. 27, 2011.
Final Office Action dated Sep. 5, 2012, U.S. Appl. No. 13/246,554, filed Sep. 27, 2011.
Advisory Action dated Nov. 2, 2012, U.S. Appl. No. 13/246,554, filed Sep. 27, 2011.
Office Action dated Dec. 5, 2012, U.S. Appl. No. 13/246,554, filed Sep. 27, 2011.
Notice of Allowance dated May 20, 2013, U.S. Appl. No. 13/246,554, filed Sep. 27, 2011.
First Action Interview Pre-Communication dated Nov. 15, 2013, U.S. Appl. No. 13/791,658, filed Aug. 20, 2013.
Notice of Allowance dated Jan. 30, 2014, U.S. Appl. No. 13/791,658, filed Aug. 20, 2013.
Restriction Requirement dated Mar. 19, 2015, U.S. Appl. No. 13/463,799, filed May 3, 2012.
Office Action dated Mar. 13, 2013, U.S. Appl. No. 13/471,107, filed May 14, 2012.
Notice of Allowance dated Aug. 26, 2013, U.S. Appl. No. 13/471,107, filed May 14, 2012.
Office Action dated Aug. 12, 2014, U.S. Appl. No. 13/769,268, filed Feb. 15, 2013.
Final Office Action dated Mar. 17, 2015, U.S. Appl. No. 13/769,268, filed Feb. 15, 2013.
First Action Interview Pre-Communication dated Dec. 1, 2014, U.S. Appl. No. 13/844,226, filed Mar. 15, 2013.
Notice of Allowance dated Mar. 12, 2015, U.S. Appl. No. 13/844,226, filed Mar. 15, 2013.
Office Action dated Jul. 14, 2014, U.S. Appl. No. 13/661,536, filed Oct. 26, 2012.
Notice of Allowance dated Jan. 6, 2015, U.S. Appl. No. 13/661,536, filed Oct. 26, 2012.
Supplemental Notice of Allowance dated Jan. 30, 2015, U.S. Appl. No. 13/661,536, filed Oct. 26, 2012.
Shipley, Trevor D., et al., Patent Application entitled "Mobile Communication System Identity Pairing," filed Aug. 26, 2011, U.S. Appl. No. 13/218,503.
Burcham, Robert H., et al., Patent Application entitled "In-car Head unit Wireless Communication Service Subscription Initialization," filed Apr. 24, 2012, U.S. Appl. No. 13/455,121.
Bloomcamp, Eric Michael, et al., Patent Application entitled "Dual Path In-Vehicle Communication," filed Feb. 15, 2013, U.S. Appl. No. 13/769,268.
Bonn, Michael J., et al., Patent Application entitled "System and Method of Utilizing Driving Profiles via a Mobile Device," filed Mar. 15, 2012, U.S. Appl. No. 13/844,226.
Bloomcamp, Eric M., et al., Patent Application entitled "Authenticating Mobile Device for on Board Diagnostic System Access," filed Sep. 23, 2013, U.S. Appl. No. 14/034,475.
Finnerty, Brian J., et al., Patent Application entitled "Method for Authenticating Driver for Registration of In-Vehicle Telematics Unit," filed Oct. 31, 2014, U.S. Appl. No. 14/530,667.
Office Action dated Sep. 9, 2015, U.S. Appl. No. 13/463,799, filed May 3, 2012.
Notice of Allowance dated Sep. 18, 2015, U.S. Appl. No. 14/304,861, filed Jun. 13, 2014.
Notice of Allowance dated Apr. 28, 2016, U.S. Appl. No. 13/218,503, filed Aug. 26, 2011.
Advisory Action dated May 20, 2016, U.S. Appl. No. 13/463,799, filed May 3, 2012.
Advisory Action dated Jun. 1, 2016, U.S. Appl. No. 14/034,475, filed Sep. 23, 2013.
First Action Interview Pre-Communication dated Apr. 25, 2016, U.S. Appl. No. 14/530,667, filed Oct. 31, 2014.
Notice of Allowance dated May 16, 2016, U.S. Appl. No. 14/703,997, filed May 5, 2015.
Service Platform for the Connected Traveler, Sep. 9, 2008, Seventh Fromwork Programme, vol. 1, 28, 43, 71, 87.
Office Action dated Sep. 26, 2016, U.S. Appl. No. 13/463,799, filed May 3, 2012.
Office Action dated Oct. 4, 2016, U.S. Appl. No. 14/034,475, filed Sep. 23, 2013.
Office Action dated Jul. 29, 2016, U.S. Appl. No. 14/530,667, filed Oct. 31, 2014.
Notice of Allowance dated Oct. 27, 2016, U.S. Appl. No. 14/530,667, filed Oct. 31, 2014.
Notice of Allowance dated Nov. 9, 2016, U.S. Appl. No. 14/819,425, filed Aug. 8, 2015.

* cited by examiner

VEHICLE REMOTE OPERATIONS CONTROL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some motor vehicles may comprise an embedded computer system referred to as a head unit or telematics unit. The head unit may provide a variety of operational features including providing centralized access to vehicle sensors and electro-mechanical devices via a controller area network (CAN) communication bus. The head units may be communicatively coupled to a wireless network, and information available to the head unit may be accessed remotely via wireless communication link. This capability may be useful in transportation industries for fleet management and maintenance. This capability may make automobile maintenance and troubleshooting easier for car dealerships and/or independent auto repair shops.

Some head units may provide wireless communication services for drivers and/or passengers of the vehicle, for example data communication links to the Internet to enable access to web applications and/or to surf the web while riding in the vehicle. The head units may also provide the ability for authorized individuals (e.g., an owner of the vehicle or proxy of the owner of the vehicle) to employ an application executing on a user equipment (UE) or mobile phone to initiate remote vehicle operations via the head unit data communication link. For example, an authenticated user may initiate a remote door unlock from a UE that propagates over a communication path from the UE to the head unit, and the head unit may command a door lock of the vehicle to unlock over a CAN bus of the vehicle.

SUMMARY

In an embodiment, a head unit for a motor vehicle is disclosed. The head unit comprises a processor, a memory, and a radio frequency transceiver, where the radio frequency transceiver is coupled to the processor via a universal serial bus (USB) protocol. The head unit further comprises a backup camera application stored in the memory that, when executed by the processor, is configured to present a backup camera image on a display in the motor vehicle and a navigation application stored in the memory that, when executed by the processor, is configured to present road navigation information on a display in the motor vehicle. The head unit further comprises a remote operations event handling application stored in the memory that, when executed by the processor, handles remote operation commands received via the radio frequency transceiver. The head unit further comprises a boot-loader application stored in the memory that, when executed by the processor, determines a head unit wake-up reason to be the reception of a high priority short message service (SMS) message, determines a key lock state of the motor vehicle to be locked, performs a discovery of USB devices coupled to the processor, wherein the radio frequency transceiver comprises one of the discovered USB devices and initiates a wireless data communication link with a wireless communication network via the radio frequency transceiver. After initiating the wireless data communication link via the radio frequency transceiver, the boot-loader application causes the processor to initiate execution of the remote operations event handling application and, after initiating execution of the remote operations event handling application, causes the processor to initiate execution of the backup camera application and execution of the navigation application, wherein an initiation order of initiating execution of the backup camera application and initiating execution of the navigation application after initiating the remote operations event handling application is based on the determination of the head unit wake-up reason to be the reception of a high priority short message service (SMS) message and based on determination of the key lock state of the motor vehicle to be locked.

In an embodiment, another head unit for a motor vehicle is disclosed. The head unit comprises a processor, a memory, and a radio frequency transceiver, where the radio frequency transceiver is coupled to the processor and is configured to establish a wireless data communication link with a wireless communication network. The head unit further comprises a remote operations event handling application stored in the memory that, when executed by the processor, subscribes to a messaging gateway to receive remote operations event messages via the radio frequency transceiver according to a publish-subscribe mechanism, receives a remote operation message via the radio frequency transceiver, and transmits a command via a controller area network (CAN) bus to an electro-mechanical device in the motor vehicle to perform an operation identified in the remote operation message.

In an embodiment, yet another head unit for a motor vehicle is disclosed. The head unit comprises a processor, a memory, and a radio frequency transceiver, where the radio frequency transceiver is coupled to the processor via a universal serial bus (USB) protocol. The head unit further comprises a backup camera application stored in the memory that, when executed by the processor, is configured to present a backup camera image on a display in the motor vehicle and a navigation application stored in the memory that, when executed by the processor, is configured to present road navigation information on a display in the motor vehicle. The head unit further comprises a graphics application stored in the memory that, when executed by the processor, is configured to present information on a display in the motor vehicle and a remote operations event handling application stored in the memory that, when executed by the processor, subscribes to a messaging gateway to receive remote operations event messages via the radio frequency transceiver according to a low-overhead publish-subscribe mechanism, receives a remote operation message via the radio frequency transceiver, and transmits a command via a controller area network (CAN) bus to an electro-mechanical device in the motor vehicle to perform an operation identified in the remote operation message. The head unit further comprises a boot-loader application stored in the memory that, when executed by the processor performs a discovery of USB devices coupled to the processor, wherein the radio frequency transceiver comprises one of the discovered USB devices and initiates a wireless data communication link with a wireless communication network via the radio frequency transceiver. After initiating the wireless data communication link via the radio frequency transceiver, the boot-loader application causes the processor to initiate execution of the remote operations event handling application and, after initiating execution of the remote operations event handling application, causes the processor to initiate execution of the back-up imaging application, execution of the navigation application, and execution of the graphics application.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
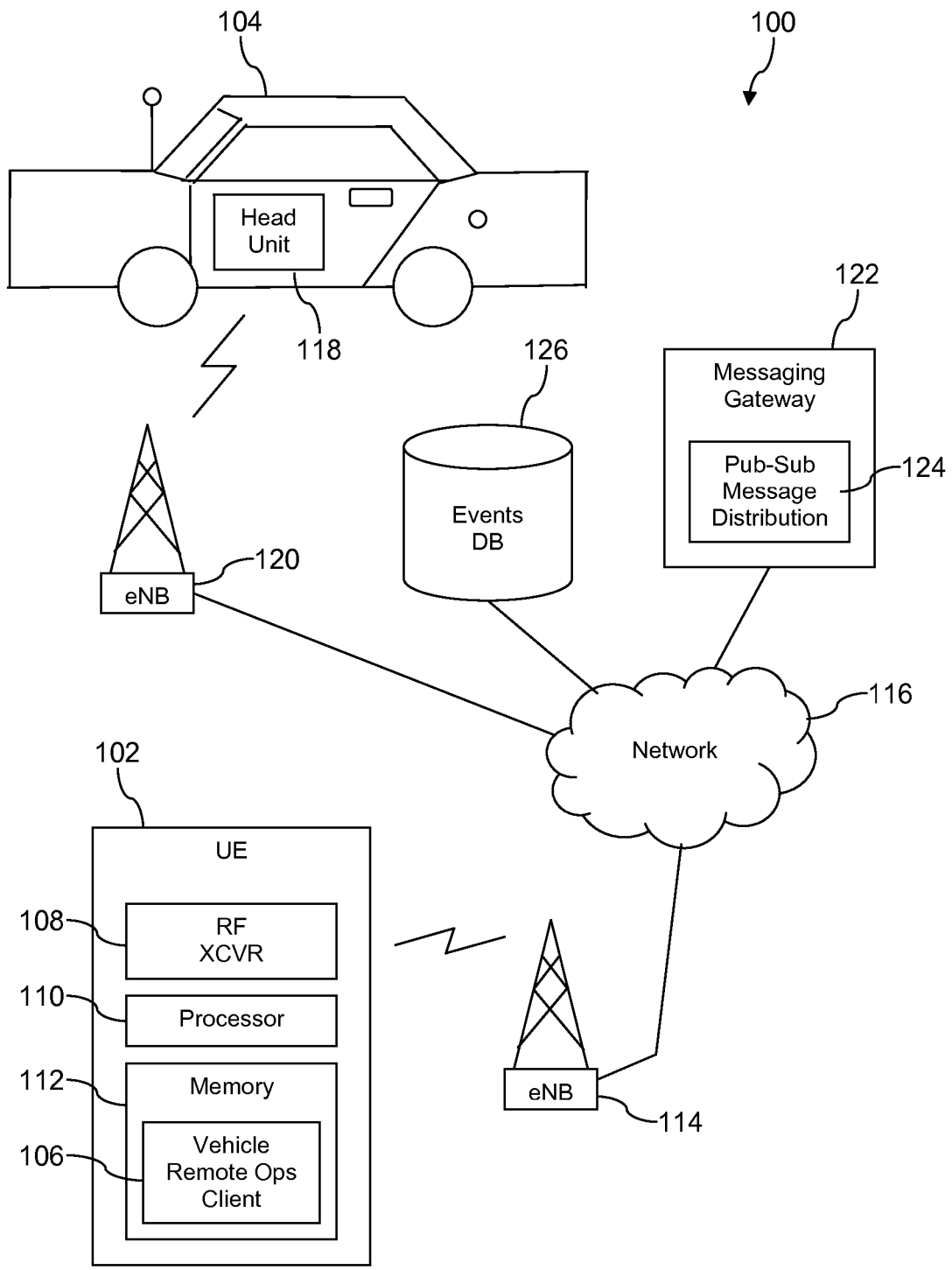
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Head units or telematics units in motor vehicles may be configured to receive and execute vehicle remote operation commands from a user equipment (UE) (e.g., a mobile phone), such as to unlock a door of a vehicle, to start an engine of the vehicle, to turn on the air conditioning of the vehicle, or to turn on the heater of the vehicle. An individual, for example, may send this command or sequence of commands from his or her UE while riding a shuttle bus from an airport terminal to an airport parking lot where the vehicle is parked, whereby the vehicle interior may be air conditioned or heated to a comfortable interior temperature by the time that the individual is dropped at the vehicle by the shuttle bus. The remote operation command may traverse a radio access network (RAN) and the public Internet before delivery to the head unit in the vehicle.

The present disclosure teaches systems and methods for accelerating the response time for completing vehicle remote operation commands. Users typically desire rapid remote operation command responses and may feel frustration or dissatisfaction for a motor vehicle product if they perceive remote operation command response to be slow. When the head unit is in a low power operation mode (also referred to in some contexts as a dormant operation mode or a sleeping operation mode), a wake-up event may trigger the head unit to transition to an awake operation mode. To achieve this transition, a boot-loader application executes on a processor of the head unit to cause the initiation of a variety of applications that execute on the processor in a concurrent execution mode. Examples of these applications are two or more of a remote operations event handling application, a backup camera application, a navigation application, a graphics application, and an entertainment radios application.

It is a teaching of the present disclosure that when the vehicle is in a locked state, the boot-loader application may establish a wireless data communication link and cause the processor to initiate the remote operations event handling application before causing the processor to initiate other applications, for example before causing the processor to initiate a backup camera application, a navigation application, or an entertainment radio application. This sequence of booting operations enables the remote operations event handling application to more rapidly receive and act upon vehicle remote operation commands, hence accelerating the response time for completing vehicle remote operation commands when the head unit is in a sleep mode. This sequencing of booting operations may further be conditioned upon a head unit wake up reason (e.g., the event that has caused the head unit to execute "wake up" and to execute the boot-loader application). In an embodiment, the described sequence of booting may be conditioned on a wake up reason that is associated with a UE sending a vehicle remote operation command message. In an embodiment, the wake up reason may be determined based on receipt of a short message service (SMS) message that is designated as a high priority SMS message.

In an embodiment, when the vehicle is in a locked state, the boot-loader application may establish a wireless data communication link and cause the processor to initiate the remote operations event handling application according to a higher execution priority and concurrently initiate other applications (e.g., the backup camera application, the navigation application, or the entertainment radio application) according to a lower execution priority. In this alternative, the remote operations event handling application may still be brought into service rapidly, but any idle processing cycles (cycles when the processor is not performing instructions in the remote operations event handling application initiation, for example while waiting for an input/output operation to complete such as establishment of a communication link with the messaging gateway) may be allocated to the lower priority initiation of other applications, thereby more rapidly initiating these other applications.

When the vehicle is in an unlocked state, a different booting sequence may be performed by the boot-loader application. For example, the remote operations event handling application may be booted after one or more applications are booted, for example after the backup camera application, the navigation application, the graphics application, and the entertainment radios application have booted. In the case that the vehicle is in an unlocked state, the driver may have recently entered the vehicle and may wish to have the backup camera application rapidly initiated to support a driving maneuver of backing out of a parking space at the end of a work day. In some jurisdictions, state or federal laws may mandate that the backup imaging system be operable within three seconds of a driver in a vehicle starting the vehicle's engine.

In an embodiment, the remote operations event handling application relies on a publish-subscribe messaging protocol to receive remote operations events (e.g., messages comprising requests to perform remote operation commands) from a messaging gateway that mediates between the UE and the head unit. For example, selection of a vehicle remote operation command by a user in a remote operation user interface screen may generate an event that is communicated from the UE to the messaging gateway. The head unit may have subscribed to receive remote operation command events from the subject UE. When the remote operation command event is received by the messaging gateway from the UE, the messaging gateway sends the event on to the subscribed head unit, and the remote operations event handling application executing on the head unit processes the remote operation command, for example unlocks a car door of the vehicle.

A publish-subscribe communication framework or mechanism may provide a variety of benefits. The entity that publishes an event (e.g., the UE publishing a vehicle remote operation command) can transmit an event message to a publish-subscribe manager (e.g., the messaging gateway) and then go back to other processing. The publishing entity does not need to establish a communication link with one or more subscribers to the event, does not need to manage special cases that may be involved in subscribers that are offline or out of wireless communication coverage. The subscriber (e.g., the head unit) can expect to receive published events without having to synchronize with the publisher or establishing a communication link with the publisher. The publish-subscribe framework may be said to decouple the publisher and the subscriber.

The publish-subscribe mechanism used to implement the teachings of the disclosure may be selected or designed to omit high overhead communication processes such as exchanges of acknowledgements and high frequency handshaking. Such a publish-subscribe mechanism may be referred to herein as a low-overhead publish-subscribe mechanism. High overhead, high frequency handshaking may refer to repeated two-way exchanges of application communication layer messages that convey no specific information other than to confirm that a communication session remains operable, for example two-way application communication layer message exchanges that occur at least every 10 seconds or more often. It is understood that periodic sending of a low-weight message, such as a ping message that does not rise to the application communication layer but rises only to the internet protocol (IP) communication layer, is distinct from the high overhead, high frequency handshaking described above. Rather than such periodic busy overhead, the head unit may transmit a state status message when the head unit changes state (e.g., an asynchronous message or event driven message in contrast to a periodic message), for example transmitting a head unit active or awake status message when the head unit boots and transmitting a head unit dormant or asleep status message when the head unit enters a low power operation mode. The head unit may send these status messages to the messaging gateway. The avoidance of high overhead communication processes known in some remote operation communication frameworks can accelerate the propagation of remote operation commands and reduce the response time of the remote operations desirably.

The use of the alternative booting sequence conditioned on the wake up reason and the use of the publish-subscribe messaging protocol to receive remote operation commands may achieve material acceleration in completion of vehicle remote operation commands. In some circumstances (when the head unit is initially in a sleep operation mode), a 90 second command response time has been reduced to about a 15 second command response time. In other circumstances (when the head unit is awake), a 30 second command response time has been reduced to about a 3 second command response time. This innovation clearly improves the head unit as a machine, as confirmed by improved response times. On a larger scale, this innovation can be said to improve the vehicle as a machine as well, because it improves the functionality of the vehicle and/or improves the driver's experience and impression of the vehicle.

Turning now to FIG. 1, a communication system 100 is described. In an embodiment, the system 100 comprises a user equipment (UE) 102 and a motor vehicle 104. A vehicle remote operations client 106 or vehicle remote operations application executes on the UE 102, promoting a user initiating vehicle operations while located remote from the vehicle 104, for example to command a door lock to unlock, to command an engine to start, and/or to command a heater to heat an interior of the vehicle while the user is away from the vehicle 104. The UE 102 comprises a radio frequency transceiver 108, a processor 110, and a memory 112 that stores the vehicle remote operations client 106. The motor vehicle 104 may be one of an automobile, a pick-up truck, a sports utility vehicle, a mini-van, a van, a delivery truck, a motorhome, a bus, a tractor-truck, or another motor vehicle.

The system further comprises a first enhanced node B (eNB) 114, a network 116, and a second eNB 120. The motor vehicle 104 comprises a head unit 118 or telematics unit. The radio frequency transceiver 108 may establish a wireless communication link with the first eNB 114 according to one or more of a long term evolution (LTE), a code division multiple access (CDMA), a global system for mobile communications (GSM), or a worldwide interoperability for microwave access (WiMAX) wireless communication protocol. Likewise the head unit 118 comprises a radio transceiver that may establish a wireless communication link with the second eNB 120 according to one or more of an LTE, a CDMA, a GSM, or a WiMAX wireless communication protocol. In an embodiment, the radio frequency transceiver 108 of the UE 102 may establish a wireless communication link with the first eNB 114 according to a first wireless communication protocol and the radio transceiver of the head unit 118 may establish a wireless communication link with the second eNB 120 according to a second wireless communication protocol, where the first protocol is not the same wireless communication protocol as the second protocol. It is understood that under some circumstances a single eNB may provide a wireless communication link to the radio frequency transceiver 108 of the UE 102 and a separate wireless communication link to the radio transceiver of the head unit 118 (e.g., when both the UE 102 and the head unit 118 are located in the coverage area of the same eNB).

In an embodiment, the head unit 118 may comprise a short range radio transceiver, for example a WiFi transceiver, a Bluetooth® transceiver, or another short range radio transceiver. The short range radio transceiver may establish communication links with an access point or a radio hot spot and obtain communication coupling to the network 116 via the access point or hot spot. As used herein, the term "short range" radio is a relative term and refers to a maximum range of the subject radio transceiver that is short relative to the maximum range of cellular wireless communication transceivers that communicate according to LTE, CDMA, GSM, or WiMAX. For example, the maximum range of a short range radio transceiver may be about 50 yards, about 100 yards, or about 300 yards. By contrast, the maximum range of a long range (e.g., cellular) radio transceiver may be about 3 miles, about 5 miles, or even longer range.

The first eNB 114 is configured to communicatively couple the UE 102 to the network 116. The second eNB 120 is configured to communicatively couple the head unit 118 to the network 116. It is understood that the eNBs 114, 120 may provide wireless communication links to other communication devices not shown in FIG. 1, for example other UEs and/or other head units. These other UEs and head units may be configured substantially similarly to the UE 102 and the head unit 118, but they need not be. For example, the eNBs 114, 120 may provide wireless communication links to UEs that do not comprise a vehicle remote operations client 106. The network 116 comprises one or more public communication networks, one or more private communication networks, or a combination thereof. At least a portion of the network 116 may comprise the public Internet.

In an embodiment, the system 100 further comprises a messaging gateway 122 that executes a publish-subscribe message distribution application 124 and an events data store 126. The messaging gateway 122 may be implemented as a computer system. Computer systems are described further hereinafter. Publication notifications received by the publish-subscribe message distribution application 124 may be stored in the events data store 126, queued for distribution to subscribed entities. In some contexts, published notifications or messages may be referred to as events or event messages.

When a publication notification or message is received by the publish-subscribe message distribution application 124, where the notification or message or event is subscribed to by an entity, the publish-subscribe message distribution application 124 may transmit the publication notification or message to the subscribed entity. When the publication notification or message is distributed to the subscribed entity, the message may or may not be stored in the events data store 126. In an embodiment, publication notifications or messages may be stored in the events data store 126 for later reference.

In an embodiment, the messaging gateway 122 or the publish-subscribe message distribution application 124 may store a state of the head unit 118, for example an awake state or an asleep state. When an event to which the head unit 118 is subscribed is received by the publish-subscribe message distribution application 124 (e.g., the UE 102 publishes a remote operation command message or event) and the head unit 118 is determined by the publish-subscribe message distribution application 124 to be in an awake state, the publish-subscribe message distribution application 124 transmits the event to the head unit 118. When the head unit 118 is determined by the publish-subscribe message distribution application 124 to be in an asleep state, the event is not sent but is instead stored, for example in the events data store 126. When the publish-subscribe message distribution application 124 is informed that the head unit 118 has transitioned to an awake state, the publish-subscribe message distribution application 124 may fetch the subject event from the events data store 126 and transmit it to the head unit 118. In some contexts, the publish-subscribe message distribution application 124 may be said to use passive event handling to transmit the event to the head unit 118 when the head unit 118 is awake at the time the event is received by the publish-subscribe message distribution application 124 and to use active event handling to transmit the event to the head unit 118 when the head unit 118 is asleep at the time the event is received by the publish-subscribe message distribution application 124.

As an example, a user may touch an icon corresponding to the vehicle remote operations client 106 that is displayed on a touchscreen of the UE 102. A vehicle remote operations user interface may be popped-up on the touchscreen that provides controls for the user to select initiation of one or more vehicle remote operations. In an embodiment, the vehicle remote operations client 106 may challenge the user to enter a personal identification number (PIN) or to input a biometric signature (e.g., swipe the user's thumb across a camera of the UE 102) before granting access to the controls.

When the head unit 118 is known by the publish-subscribe message distribution application 124 and/or by the messaging gateway 122 to be in a sleep state and a remote operation command is received from the UE 102, the publish-subscribe message distribution application 124 and/or the messaging gateway 122 may send a high priority short message service (SMS) message to the head unit 118. Even in the sleep mode of operation, a voice channel radio transceiver of the head unit 118 may be operable to receive and process a SMS message. As discussed further hereinafter, the head unit 118 may respond to a high priority SMS message by transitioning from the sleep state to the awake state under some conditions. Alternatively, in an embodiment, if the UE 102 determines that the head unit 118 is in a sleep state, the UE 102 may transmit a high priority SMS message to the voice channel radio transceiver of the head unit, in association with the UE 102 sending a remote operation command to the head unit 118 via the messaging gateway 122.

The vehicle remote operations client 106 may provide user access to a vehicle access remote operation command, a vehicle environment control remote operation command, and a vehicle light and horn control remote operation command. The vehicle remote operations client 106 may provide user access to a door unlock vehicle remote operation command, a door lock vehicle remote operation command, an engine start vehicle remote operation command, an engine stop vehicle remote operation command, a light and horn vehicle remote operation command (or a lights and horns command), a heater on vehicle remote operation command, a heater off vehicle remote operation command, a defroster on vehicle remote operation command, a seat heater on vehicle remote operation command, a seat heater off vehicle remote operation command, an air conditioning on vehicle remote operation command, an air conditioning off vehicle remote operation command, a security system arm vehicle remote operation command, and a security system disarm vehicle remote operation command. The light and horn vehicle remote operation command may cause the lights and horn of the vehicle 104 to flash on and off, providing assistance in locating the vehicle in a large parking lot such as a sports venue. The light and horn vehicle remote operation may also be used to draw attention in the event a user feels insecure or physically threatened when proximate to the vehicle 104. In an embodiment, the vehicle remote operations client 106 may provide user access to other vehicle remote operation commands. The vehicle remote operations client 106 may enable the user to read state information or metrics information about the vehicle 104, for example a fuel level, a tire pressure, an outside temperature proximate to the vehicle, a presence of precipitation, or other metrics.

It is understood that other remote operation commands may be supported, for example in the future with further elaboration and refinement of such commands. For example, in the future, the remote operation commands may comprise a charging command (in the context of an electric vehicle, this may be a command to commence charging the battery), a drive to me command (in the context of autonomous vehicle operation or computer driving operation), and others.

Continuing with the example, the user may select a door unlock command, and the vehicle remote operations client 106 may transmit a door unlock command event or message via the radio frequency transceiver 108 of the UE 102 via the first eNB 114 and via the network 116 to the messaging gateway 122. This may be referred to in some contexts as publishing the door unlock command event or message. In an embodiment, the messaging gateway 122 may be subscribed to or registered with the UE 102 to receive the event messages or event notifications published by the UE 102. Alternatively, the vehicle remote operations client 106 may be configured to transmit the remote operations command or message to the messaging gateway 122 without using a publish-subscribe messaging mechanism (e.g., the head unit 118 may communicate with the messaging gateway 122 according to a publish-subscribe mechanism while the UE 102 communicates with the messaging gateway 122 according to a different mechanism or communication design model). The messaging gateway 122 may store the door unlock command event in the events data store 126.

If the head unit 118 is subscribed to the door unlock command event, the messaging gateway 122 may transmit the door unlock command event (or a copy of the door unlock command event) to the radio transceiver of the head unit 118 via the network 116 and via the second eNB 120. This may be referred to in some contexts as the messaging gateway 122 publishing the door unlock command event or message to the head unit 118. In response to receiving the door unlock command event, the head unit 118 may send a door unlock command via a controller area network (CAN) bus to a radio frequency (RF) hub (not shown) of the vehicle 104, and the RF hub may command one or more doors of the vehicle 104 to unlock. Electro-mechanical door lock(s) may then respond to the command from the RF hub by moving to an unlocked position. It is understood that the head unit 118 may communicate with other electro-mechanical devices and/or sensors in the motor vehicle 104 via the CAN bus or via other communication linkages to enact and/or execute vehicle remote operations commands.

Figure 2:
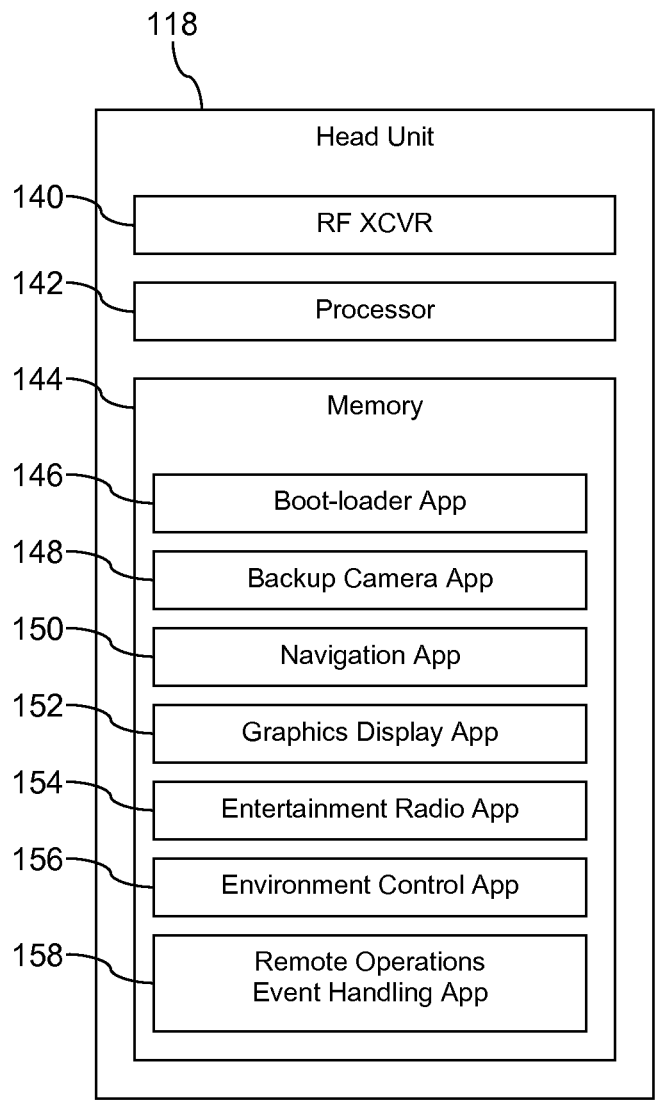
FIG. 2 is a block diagram of a vehicle head unit according to an embodiment of the disclosure.

Turning now to FIG. 2, an embodiment of the head unit 118 is described. The head unit 118 may comprise a radio frequency transceiver 140, a processor 142, and a memory 144. The memory 144 stores a boot-loader application 146 and a remote operations event handling application 158. The memory 144 may further store other applications such as one or more of a backup camera application 148, a navigation application 150, a graphics display application 152, an entertainment radio application 154, and an environment control application 156.

The backup camera application 148 provides logic to implement presentation of a backup camera image on a display of the motor vehicle 104, for example on a display screen located in a central console of the vehicle 104. The backup camera application 148 may be configured to process sensor input from one or more rearwards directed cameras to generate a unified mirror image that a driver of the motor vehicle may look at to intuitively steer the vehicle 104 while backing up. It is noted that in this context a mirror image means that objects that are on the right hand side of the rearwards directed cameras is presented on the left hand side of the display. In some states and/or in some federal jurisdictions, backup camera applications 148 and/or backup imaging systems may be required to operational within a predefined period of time after an engine of a motor vehicle is started, after the transmission of the vehicle is shifted to reverse, or with reference to some other event.

The navigation application 150 may be configured to determine a location of the motor vehicle 104 and to provide navigation assistance to the driver of the vehicle 104. For example, the navigation application 150 may obtain global positioning system (GPS) coordinates from a GPS radio receiver in the head unit 118 to determine the location of the vehicle 104. A user may enter a destination location or select a pre-configured destination location and command the navigation application 150 to provide navigation cues to assist the driver to transit the roadways to the destination. The navigation application 150 may comprise a database of roadway information to support providing the navigation cues to any entered or selected destination location. Initiating the navigation application 150 may entail identifying a current location of the vehicle 104 and loading a selection of roadway information into cache memory or rapidly accessible memory to promote timely processing of navigational logic. The navigational information and/or cues may be partly presented as graphics cues on a display and partly presented as aural cues via a speaker system.

The graphics display application 152 may be configured to provide services for presenting images on a display of the motor vehicle 104, for example a display located in a central console of the vehicle 104. Other applications, for example the backup camera application 148 and the navigation application 150, may use the graphics display application 152 to present their visual information to the driver and/or passengers of the vehicle 104.

An entertainment radio application 154 may be configured to provide AM radio functionality, FM radio functionality, and satellite radio functionality. The entertainment radio application 154 may be communicatively coupled to one or more radio receivers to receive broadcast audio content. In an embodiment, the entertainment radio application 154 may have additional functionality to condition and amplify audio content for playback through speakers. For example, the entertainment radio application 154 may present a control interface on the display that a driver or passenger can use to adjust volume, bass, midrange, treble, left-right balance, front-rear fade, and other operational parameters of an audio system in the motor vehicle 104. In an embodiment, the entertainment radio application 154 may further support receiving and processing audio input from a compact disc player, from an auxiliary device such as an MP3 player, or from some other audio source.

An environment control application 156 may be configured to control air conditioning and heating systems of the motor vehicle to maintain the interior environment of the motor vehicle 104 at a temperature that is comfortable to the driver and/or passengers. In an embodiment, the environment control application 156 may comprise two or more environment control applications or application frameworks. For example, control of the vehicle heating system may be provided via a first environment control application framework and control of the vehicle air conditioning system may be provided by a second environment control application framework. A windshield defrosting system may be provided by a third environment control application framework, or the defrosting system may be integrated with the vehicle heating system.

The remote operations event handling application 158 is configured to subscribe to vehicle remote operation events and to process those events. In an embodiment, subscribing to remote operation events may comprise registering these subscriptions with the publish-subscribe message distribution application 124 and/or with the messaging gateway 122. In an embodiment, the publish-subscribe message distribution application 124 and the remote operations event handling application 158 may communicate using a publish-subscribe mechanism such as a message queue telemetry transport (MQTT), an advanced message queuing protocol (AMQP, or an extensible messaging and presence protocol (XMPP) messaging protocol.

It is understood that the remote operations event handling application 158 stored in the memory 144 of the head unit 118 of a first motor vehicle may subscribe to vehicle remote operation events associated with a first UE 102 while the remote operations event handling application 158 stored in the memory 144 of the head unit 118 of a second motor vehicle may subscribe to the vehicle remote operations events associated with a second UE 102. Thus, a plurality of UEs 102 may publish vehicle remote operation events to the messaging gateway 122, and the publish-subscribe message distribution application 124 will distinguish among these events and promote publishing the events from a first UE to a first vehicle, publishing the events from a second UE to a second vehicle, publishing the events from a third UE to a third vehicle, and so on accordingly.

When the remote operations event handling application 158 receives a vehicle remote operation event publication from the publish-subscription distribution application 124, the remote operations event handling application 158 processes the event and/or message. For example, the remote operations event handling application 158 may send a command to an electro-mechanical device in the motor vehicle 104 via the CAN bus. When the remote operations event handling application 158 is initiated during booting of the head unit 118, the remote operations event handling application 158 may send a message to the publish-subscribe message distribution application 124 to subscribe to or register to receive vehicle remote operation events.

The remote operations event handling application 158 may also send a head unit awake status message when it initiates to the publish-subscribe message distribution application 124 or to another application that executes in the messaging gateway 122. Alternatively, some other application may send a head unit awake status message to the publish-subscribe message distribution application 124 or to another application that executes in the messaging gateway 122 when the head unit 118 transitions from a low-power or dormant state to a powered or awake state. In an embodiment, the boot-loader application 146 may send a head unit awake status message to the publish-subscribe message distribution application 124 or to another application that executes in the messaging gateway 122. In an embodiment, the head unit 118 may transmit a head unit awake status message to the UE 102 and/or to the vehicle remote operations client 106 when the head unit 118 transitions from the low-power or dormant state to the powered or awake state.

When the head unit 118 transitions from the powered or awake state to the low-power or dormant state, the head unit 118 may transmit a head unit asleep status message to the messaging gateway 122, to the publish-subscribe message distribution application 124, and/or to the vehicle remote operations client 106. The head unit 118 may transition to the low-power or dormant state under a variety of conditions, for example in response to a door lock event in combination with an engine off condition. The head unit 118 may transition to the low-power or dormant state in response to an engine off condition and passage of a pre-defined time duration after the engine off event. The remote operations event handling application 158 may transmit the head unit asleep or sleep state status message via the radio frequency transceiver 140 to the second eNB 120, to the network 116, to the messaging gateway 122 and/or the publish-subscribe message distribution application 124.

The remote operations event handling application 158 may also transmit the head unit asleep or sleep state status message to the UE 102. In an embodiment, the UE 102 may store the current state of the head unit 118, and the vehicle remote operations client 106 may represent this state in the appearance of the icon associated with the client 106 (see icon 406 in FIG. 4). For example, the icon associated with the vehicle remote operations client 106 may be depicted in a ghosted or greyed-out appearance when the head unit 118 is known to be in a sleep operation mode and in an unghosted or solid appearance when the head unit 118 is known to be in an awake operation mode. When the head unit 118 is known to be in the sleep operation mode, the user interface of the vehicle remote operations client 106 may present a message on a display of the UE 102 indicating that a selected remote operation command may receive a delayed response due to the head unit 118 being in a sleep mode. Alternatively, the display may indicate that the head unit 118 is in the sleep operation mode to the user in some other way, for example by flashing the selected remote operation command control several times or in some other way. This kind of pro-active notification to a user may manage the user's expectations and reduce dissatisfaction with delayed remote operation command responses.

Figure 3A:
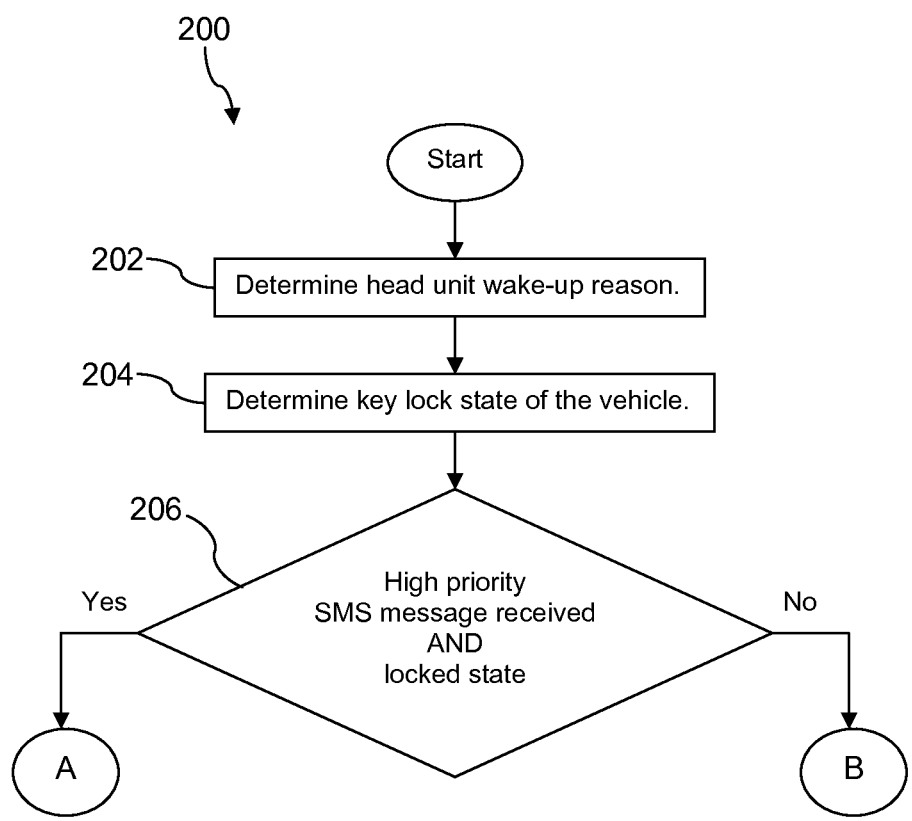
FIG. 3A, FIG. 3B, and FIG. 3C are a flow chart of a method according to an embodiment of the disclosure.
Figure 3B:
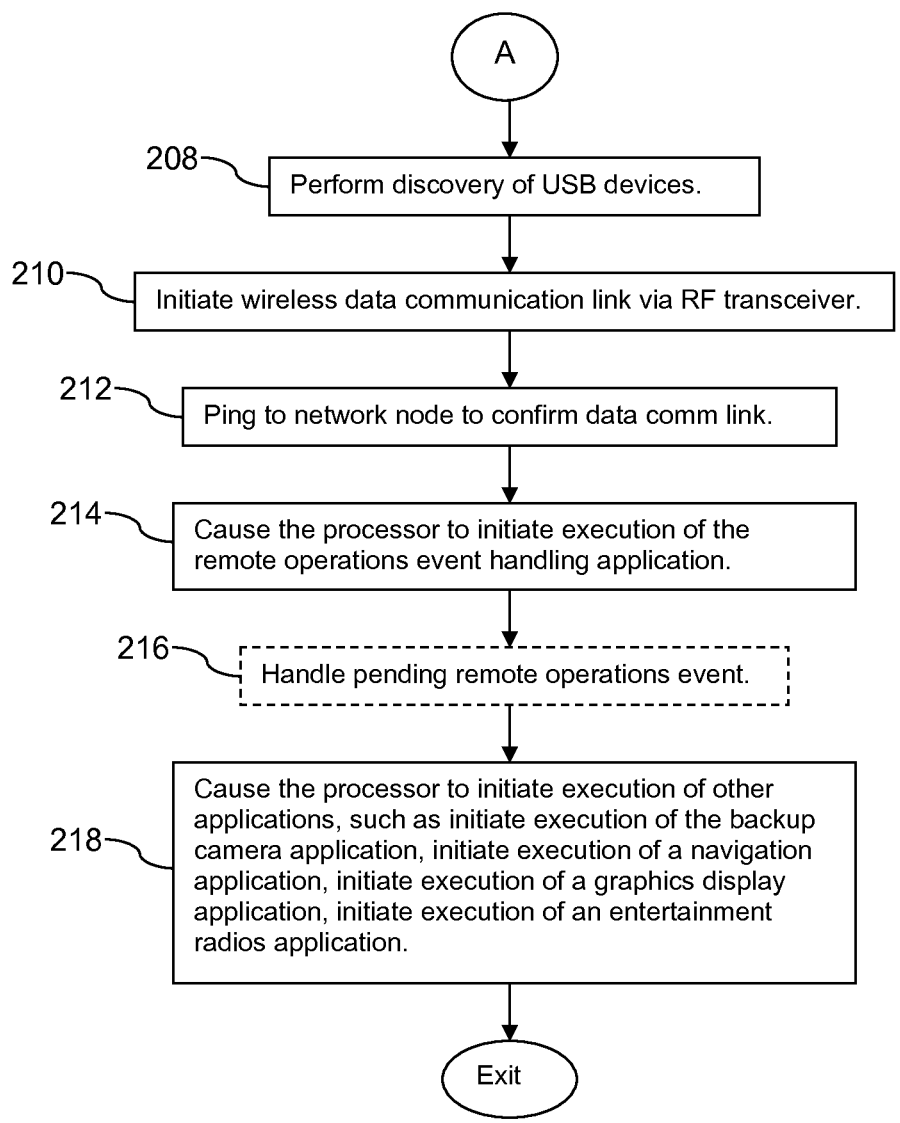
Figure 3C:
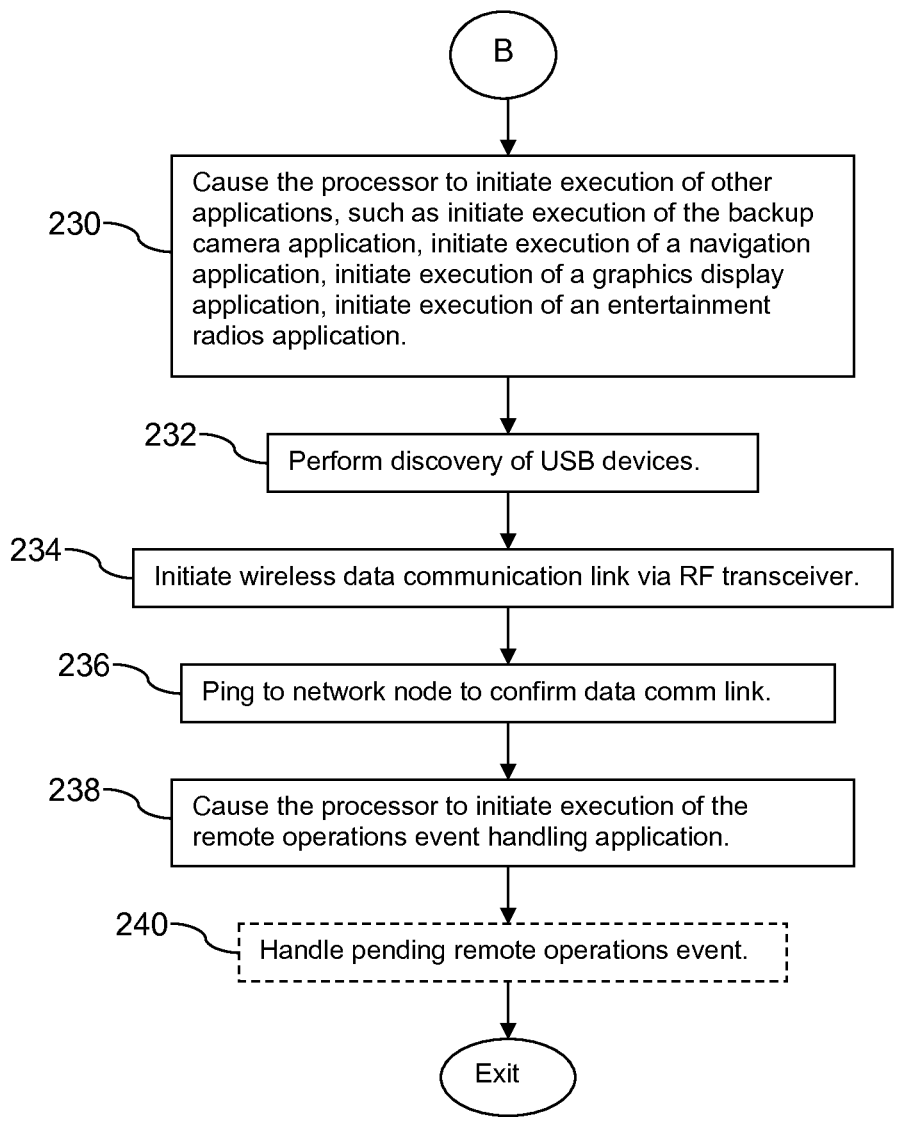

Turning now to FIG. 3A, FIG. 3B, and FIG. 3C, a method 200 is described. The method 200 may be performed by one or more applications that execute on the processor 142 of the head unit 118. For example, most of the processing actions of the method 200 may be performed by the boot-loader application 146 while one illustrated process action may be performed by the remote operations event handling application 158. The method 200 may be started when the head unit 118 transitions from a low-power operation mode or dormant mode to an awake operation mode. In the dormant operation mode, most of the processing of the head unit 118 is discontinued to conserve battery power of the motor vehicle.

At block 202, a head unit wake-up reason is determined. A variety of events may occur to cause the head unit 118 to wake up or transition out of dormant operation mode into awake operation mode. One event is receipt of a short message service (SMS) message. The SMS message may be examined to determine if it is a high priority SMS message. At block 204, a key lock state of the vehicle is determined. The key lock state of the vehicle may indicate whether the vehicle key is present in the vehicle or not, for example whether a key fob is detected to be present in the vehicle. Alternatively, the key lock state of the vehicle may indicate whether all the doors are locked or not.

At block 206, if the wake-up reason is determined to be receipt of a high priority SMS message and if the key lock state of the vehicle is determined to be locked (no key present and/or no key fob is detected to be present in the vehicle), the method 200 proceeds to block 208 where a discovery of universal serial bus (USB) devices is performed. In an embodiment, the radio frequency transceiver 140 communicates with the processor 142 according to a USB communication protocol and hence is deemed a USB device. Block 208 may discover the presence of the radio frequency transceiver 140. In another embodiment, however, the head unit 118 and/or the boot-loader application 146 may be pre-configured to recognize or address the radio frequency transceiver 140 without relying upon a discovery process. Additionally, in another embodiment, the radio frequency transceiver 140 may be communicatively coupled to the processor 142 according to a different communication protocol.

At block 210, a wireless data communication link is established between the radio frequency transceiver 140 and the first eNB 114. Part of the processing of block 210 may comprise monitoring the in-progress establishment of the wireless data communication link. At block 212, a network node is "pinged" to confirm the data communication link is up. The ping can be sent to any pre-configured or discovered network node.

At block 214, the processor 142 is commanded to initiate execution of the remote operations event handling application 158. In some contexts, this may be referred to as booting the remote operations event handling application 158. As is known to one skilled in the art, booting an application may comprise a variety of different steps including loading some or all of the logic instructions of the application into random access memory (RAM) or into cache memory, building data structures used by the application, and possibly establishing one or more communication sessions.

After it is initiated, the remote operations event handling application 158 continues to execute, in a multi-tasking concurrent execution mode, until the head unit 118 transitions to a low-power operation mode or dormant operation mode. The remote operations event handling application 158 may register to receive remote operation events from the publish-subscribe distribution application 124 during boot. At block 216, any pending remote operation events stored in the events data store 126 may be received and handled (e.g., processed or acted upon) by the remote operations event handling application 158. For example, the messaging gateway 122 may transmit the event via the network 116 and via the second eNB 120 to the radio transceiver 140 of the head unit 118 and thence to the vehicle remote operations event handling application 158 for processing. The processing of block 216 is enclosed in a dotted-line box in FIG. 3B to distinguish this processing that is performed by the remote operations event handling application 158 from processing of the other boxes that is performed by the boot-loader application 146 or by other applications or processes.

After first causing the processor 142 to initiate execution of the remote operations event handling application 158 at block 214, at block 218, the processor 142 is commanded by the boot-loader application 146 to initiate execution of other applications. For example, at block 218, the processor 142 may be commanded to initiate execution of one or more of the backup camera application 148, the navigation application 150, the graphics display application 152, the entertainment radio application 154, and the environment control application 156. The boot-loader application 146 may also cause the processor 142 to initiate execution of other applications and/or to perform one time boot scripts or logic. In an embodiment, the boot-loader application 146 may further discover and/or initiate one or more media interfaces for other in-vehicle devices, for example devices communicatively coupled to the CAN bus.

At block 206, if the wake up reason is determined to be NOT receipt of a high priority SMS message or if the key lock state of the vehicle is determined to be an unlocked state (e.g., presence of the key fob is detected), the processing proceeds to block 230. At block 230, the boot-loader application 146 causes the processor 142 to initiate execution of applications other than the remote operations event handling application 158, for example one or more of the backup camera application 148, the navigation application 150, the graphics display application 152, the entertainment radio application 154, and the environment control application 156. The boot-loader application 146 may also cause the processor 142 to initiate execution of other applications and/or to perform one time boot scripts or logic. In an embodiment, the boot-loader application 146 may further discover and/or initiate one or more media interfaces for other in-vehicle devices, for example devices communicatively coupled to the CAN bus.

At block 232, a discovery of USB devices is performed. The processing of block 232 may discover the presence of the radio frequency transceiver 140. At block 234, a wireless data communication link is established between the radio frequency transceiver 140 and the first eNB 114. At block 236, a network node may be "pinged" to confirm the data communication link is up. The ping can be sent to any pre-configured or discovered network node.

After the boot-loader 146 has booted the one or more other applications (e.g., those of the backup camera application 148, the navigation application 150, the graphics display application 152, the entertainment radio application 154, and the environment control application 156 that are installed in the head unit 118), at block 238, the processor 142 is commanded to initiate execution of the remote operations event handling application 158. In some contexts, this may be referred to as booting the remote operations event handling application 158 after the other applications.

After it is initiated, the remote operations event handling application 158 continues to execute, in a multi-tasking concurrent execution mode, until the head unit 118 transitions to a low-power operation mode or dormant operation mode. The remote operations event handling application 158 may register to receive remote operation events from the publish-subscribe distribution application 124 during boot. At block 240, any pending remote operation events stored in the events data store 126 may be received and handled by the remote operations event handling application 158. The processing of block 240 is enclosed in a dotted-line box in FIG. 3C to distinguish this processing that is performed by the remote operations event handling application 158 from processing of the other boxes that is performed by the boot-loader application 146 or by other applications or processes.

Figure 4:
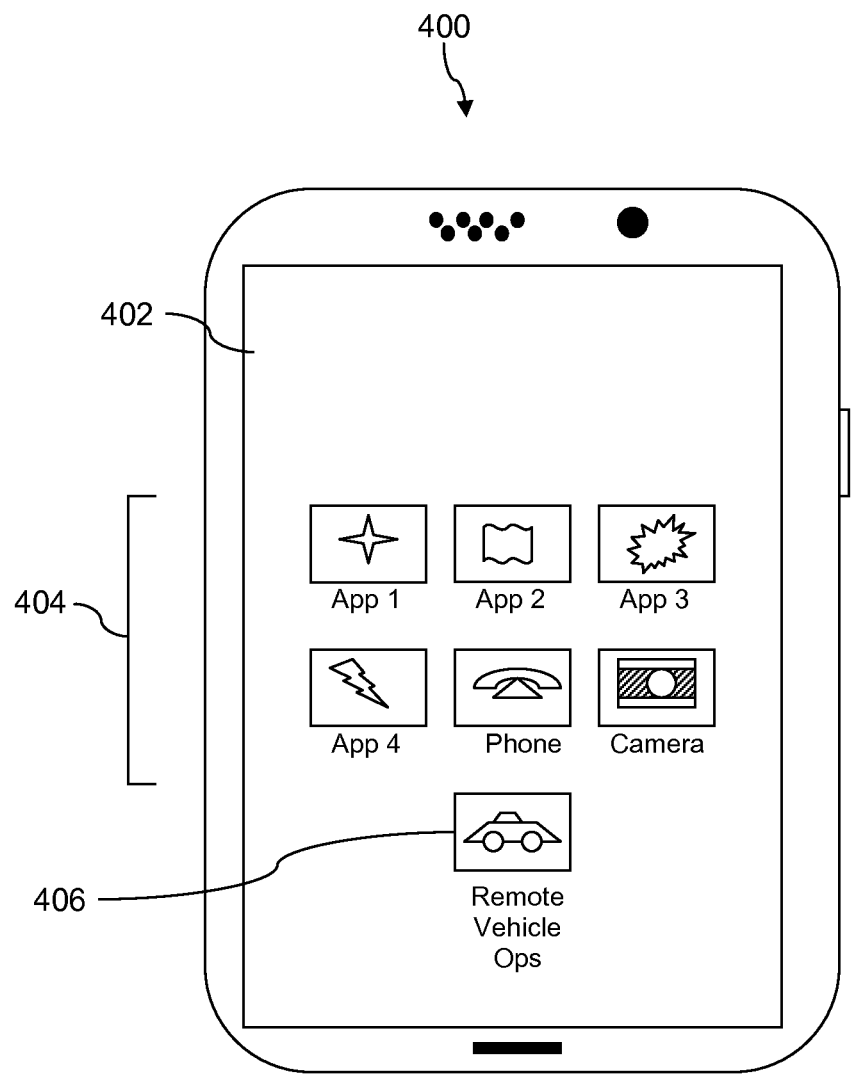
FIG. 4 is an illustration of a user equipment (UE) according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402.

Among the application icons 404 is a remote vehicle operations client icon 406. When the remote vehicle operations client icon 406 is selected by touching, a remote vehicle operations user interface screen may be presented on the touchscreen display 402. Using this interface screen, the user may be able to invoke remote operation commands of the vehicle 104 via the head unit 118, for example remote door unlock command, remote door lock command, remote engine start command, remote engine stop command, remote horns and lights command, and the like. This interface screen may also present information about the vehicle 104.

In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
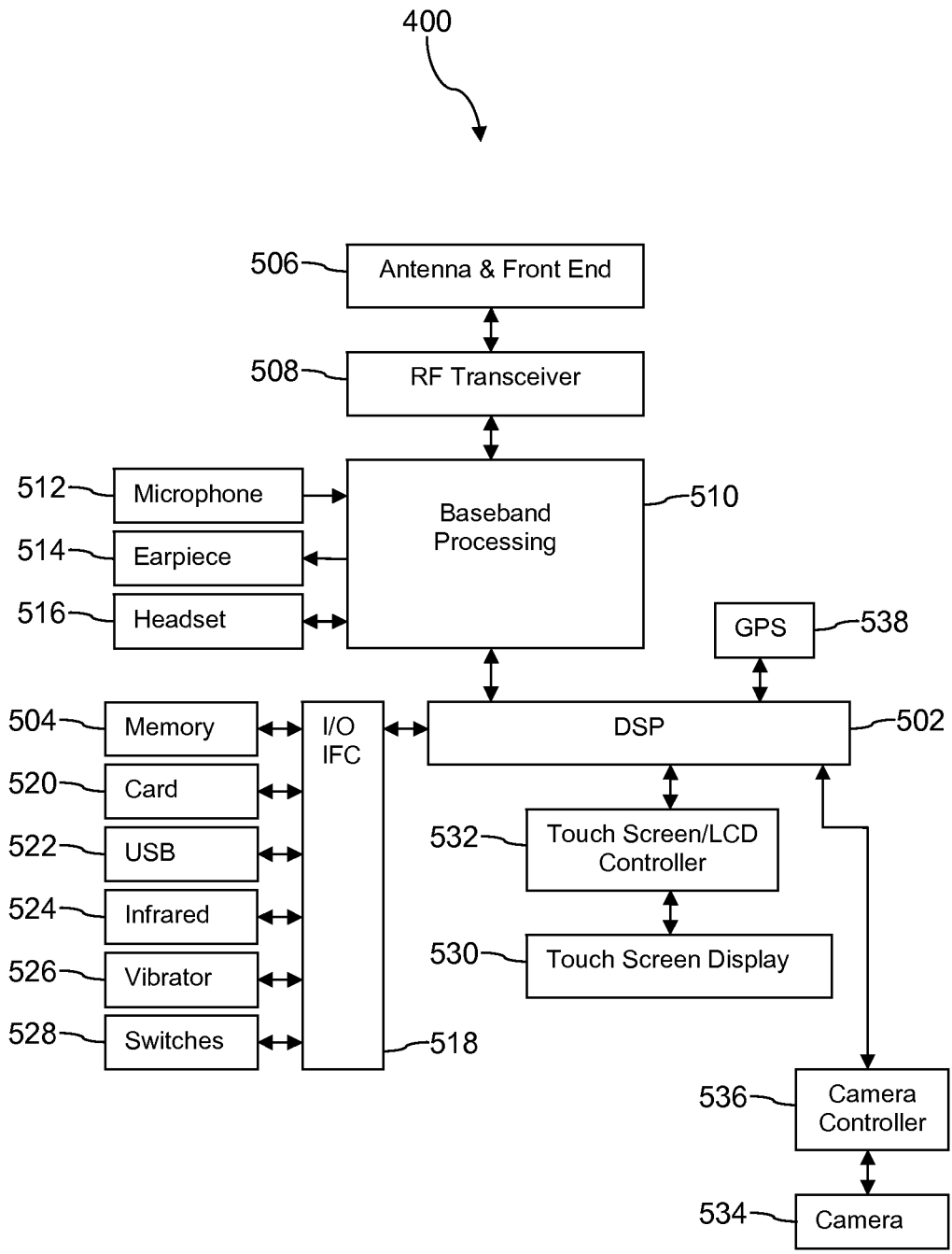
FIG. 5 is a block diagram of a hardware architecture for a UE according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
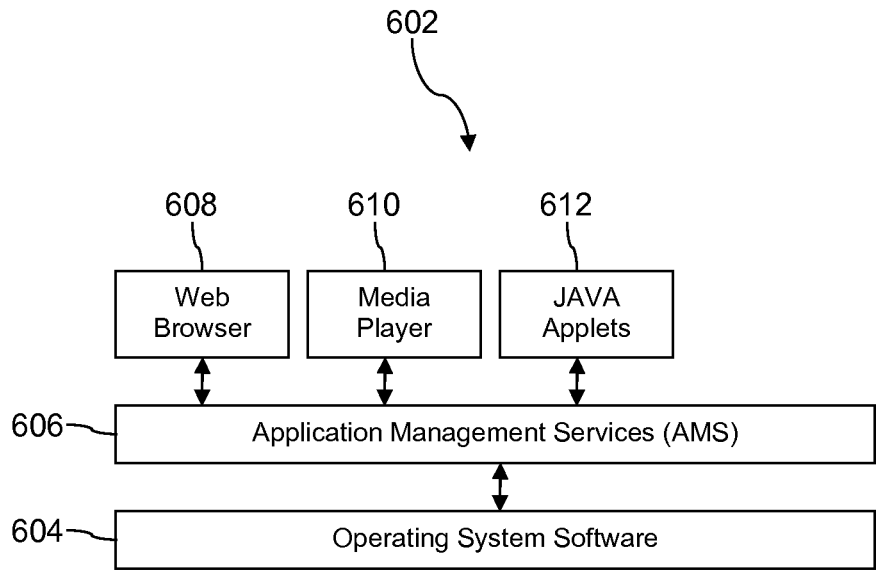
FIG. 6A is a block diagram of a software architecture for a UE according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
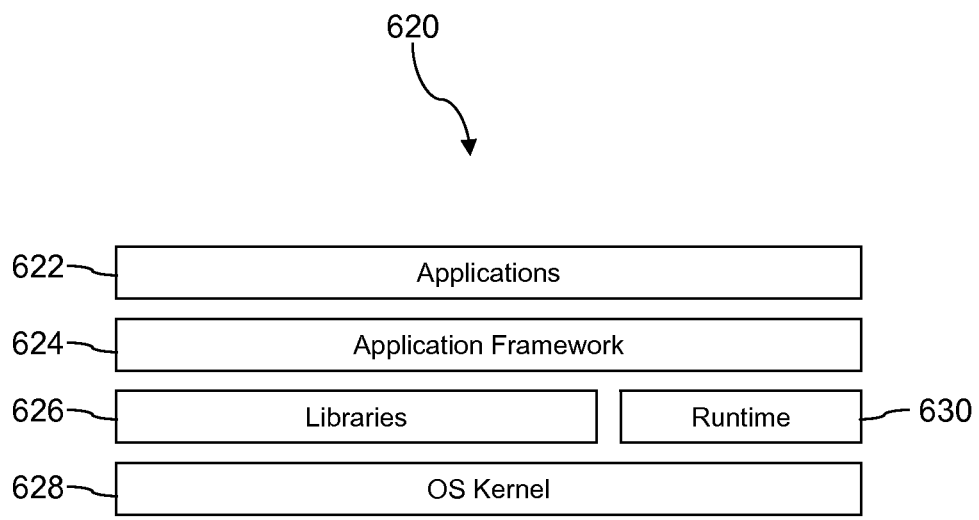
FIG. 6B is a block diagram of another software architecture for a UE according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
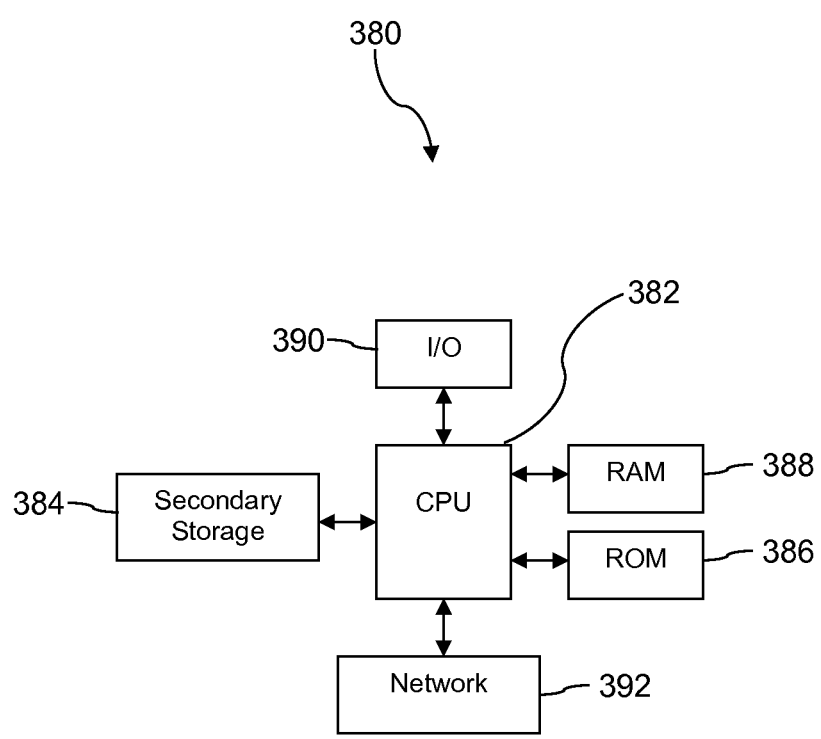
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A head unit for a motor vehicle, comprising:
    a processor;
    a non-transitory memory;
    a radio frequency transceiver, where the radio frequency transceiver is coupled to the processor via a universal serial bus (USB) protocol;
    a backup camera application stored in the non-transitory memory that, when executed by the processor, is configured to present a backup camera image on a display in the motor vehicle;
    a navigation application stored in the non-transitory memory that, when executed by the processor, is configured to present road navigation information on a display in the motor vehicle;
    a remote operations event handling application stored in the non-transitory memory that, when executed by the processor, handles remote operation commands received via the radio frequency transceiver without establishment of a communication link directly between the head unit and a user equipment associated with the remote operation commands; and a boot-loader application stored in the non-transitory memory that, when executed by the processor:
   determines a head unit wake-up reason to be reception of a high priority short message service (SMS) message,
   determines a key lock state of the motor vehicle to be locked,
   performs a discovery of USB devices coupled to the processor, wherein the radio frequency transceiver comprises one of the discovered USB devices,
   in response to the determination that the key lock state of the motor vehicle is locked, initiates a wireless data communication link with a wireless communication network via the radio frequency transceiver,
   after initiating the wireless data communication link via the radio frequency transceiver, causes the processor to initiate execution of the remote operations event handling application, and
   after initiating execution of the remote operations event handling application, causes the processor to initiate execution of the backup camera application and execution of the navigation application,
   wherein initiation of the backup camera application and the navigation application after initiation of the remote operations event handling application is based on the determination of the head unit wake-up reason to be reception of the high priority SMS message and based on the determination that the key lock state of the motor vehicle is locked.

2. The head unit of claim 1, wherein the remote operations event handling application, when executed by the processor, receives a remote operation message via the radio frequency transceiver and transmits a command via a controller area network (CAN) bus to an electro-mechanical device in the motor vehicle to perform an operation identified in the remote operation message.

3. The head unit of claim 2, wherein the operation identified in the remote operation message is one of a vehicle access remote operation command, a vehicle environment control remote operation, and a vehicle light and horn control remote operation.

4. The head unit of claim 2, wherein the operation identified in the remote operation message is one of a door lock operation, a door unlock operation, an engine on operation, an engine off operation, a light and horn operation, a defroster on operation, a defroster off operation, a heater on operation, a heater off operation, an air conditioning on operation, an air conditioning off operation, a seat heater on operation, or a seat heater off operation.

5. The head unit of claim 1, wherein the radio frequency transceiver is configured to communicate according to at least one of a code division multiple access (CDMA), a global system for mobile communications (GSM), a long term evolution (LTE), or a worldwide interoperability for microwave access (WiMAX) radio transceiver.

6. The head unit of claim 1, further comprising a graphics application stored in the non-transitory memory that, when executed by the processor, is configured to present information on a display in the motor vehicle, wherein after initiating execution of the remote operations event handling application, the boot-loader application further causes the processor to initiate execution of the backup camera application, execution of the navigation application, and execution of the graphics application, wherein an initiation order of initiating execution of the graphics application after initiating the remote operations event handling application is based on the determination of the head unit wake-up reason to be reception of the high priority SMS message and based on the determination that the key lock state of the motor vehicle is locked.

7. The head unit of claim 1, wherein the boot-loader application further monitors an in-progress wireless data communication link set-up and transmits a ping message over the wireless data communication link.

8. A head unit for a motor vehicle, comprising:
a processor;
a non-transitory memory;
a radio frequency transceiver, where the radio frequency transceiver is coupled to the processor and is configured to establish a wireless data communication link with a messaging gateway via a wireless communication network;
a backup camera application stored in the non-transitory memory that, when executed by the processor, is configured to present a backup camera image on a display in the motor vehicle;
a navigation application stored in the non-transitory memory that, when executed by the processor, is configured to present road navigation information on a display in the motor vehicle;
a graphics application stored in the non-transitory memory that, when executed by the processor, is configured to present information on a display in the motor vehicle;
a remote operations event handling application stored in the non-transitory memory that, when executed by the processor,
   subscribes to the messaging gateway to receive remote operations event messages via the radio frequency transceiver according to a publish-subscribe mechanism that omits exchanges of acknowledgements and omits high frequency handshaking between the head unit and the messaging gateway,
   in response to the subscription that omits exchanges of acknowledgements and omits high frequency handshaking between the head unit and the messaging gateway, receives, from the message gateway, a remote operation message via the radio frequency transceiver without establishment of a communication link directly between the head unit and a user equipment associated with the remote operation message, and
   based on the remote operation message, transmits a command via a controller area network (CAN) bus to an electro-mechanical device in the motor vehicle to perform an operation identified in the remote operation message; and
a boot-loader application stored in the non-transitory memory that, when executed by the processor:
   determines a head unit wake-up reason to be reception of a high priority short message service (SMS) message,
   determines a key lock state of the motor vehicle to be locked,
   based on the determination of the head unit wake-up reason to be reception of the high priority SMS message and based on the determination that the key lock state of the motor vehicle is locked, causes the processor to initiate execution of the remote operations event handling application, and after initiating execution of the remote operations event handling application, causes the processor to initiate execution of the backup camera application, the navigation application, and the graphics application.

9. The head unit of claim 8, wherein the publish-subscribe mechanism is one of a message queue telemetry transport (MQTT), an advanced message queuing protocol (AMQP), and an extensible messaging and presence protocol (XMPP) messaging protocol.

10. The head unit of claim 8, wherein the operation identified in the remote operation message includes at least one of a door lock operation, a door unlock operation, an engine on operation, an engine off operation, a light and horn operation, a defroster on operation, a defroster off operation, a heater on operation, a heater off operation, an air conditioning on operation, an air conditioning off operation, a seat heater on operation, a seat heater off operation, or any combination thereof.

11. The head unit of claim 8, wherein the remote operations event handling application transmits a head unit sleep state message via the radio frequency transceiver when the head unit prepares to enter a low power consumption operation mode.

12. The head unit of claim 8, wherein the remote operation message received via the radio frequency transceiver is originated by a vehicle remote operation client executing on a user equipment (UE), is transmitted by the UE to the messaging gateway, and is transmitted to the head unit by the messaging gateway.

13. The head unit of claim 8, wherein the motor vehicle includes at least one of an automobile, a pick-up truck, a sports utility vehicle, a mini-van, a van, a delivery truck, a motorhome, a bus, a tractor-truck, or any combination thereof.

14. The head unit of claim 8,
wherein the boot-loader application, when executed by the processor:
determines a head unit wake-up reason to be reception of a low priority short message service (SMS) message or determines a key lock state of the motor vehicle to be unlocked,
based on the determination of the head unit wake-up reason to be reception of the low priority SMS message or the determination that the key lock state of the motor vehicle is unlocked, causes the processor to initiate execution of the backup camera application, the navigation application, and the graphics application, and
after initiating execution of the backup camera application, the navigation application, and the graphics application, causes the processor to initiate execution of the remote operations event handling application.

15. A head unit for a motor vehicle, comprising:
a processor;
a non-transitory memory;
a radio frequency transceiver, where the radio frequency transceiver is coupled to the processor via a universal serial bus (USB) protocol;
a backup camera application stored in the non-transitory memory that, when executed by the processor, is configured to present a backup camera image on a display in the motor vehicle;
a navigation application stored in the non-transitory memory that, when executed by the processor, is configured to present road navigation information on a display in the motor vehicle;
a graphics application stored in the non-transitory memory that, when executed by the processor, is configured to present information on a display in the motor vehicle;
a remote operations event handling application stored in the non-transitory memory that, when executed by the processor,
subscribes to a messaging gateway to receive remote operations event messages via the radio frequency transceiver according to a low-overhead publish-subscribe mechanism,
receives a remote operation message via the radio frequency transceiver without establishment of a communication link directly between the head unit and a user equipment associated with the remote operation message, and
based on the remote operation message, transmits a command via a controller area network (CAN) bus to an electro-mechanical device in the motor vehicle to perform an operation identified in the remote operation message; and
a boot-loader application stored in the non-transitory memory that, when executed by the processor,
performs a discovery of USB devices coupled to the processor, wherein the radio frequency transceiver comprises one of the discovered USB devices,
initiates a wireless data communication link with a wireless communication network via the radio frequency transceiver,
after initiating the wireless data communication link via the radio frequency transceiver, causes the processor to initiate execution of the remote operations event handling application, and
after initiating execution of the remote operations event handling application, causes the processor to initiate execution of the back-up imaging application, execution of the navigation application, and execution of the graphics application.

16. The head unit of claim 15, wherein the operation identified in the remote operation message is one of a door lock operation, a door unlock operation, an engine on operation, an engine off operation, a light and horn operation, a defroster on operation, a defroster off operation, a heater on operation, a heater off operation, an air conditioning on operation, an air conditioning off operation, a seat heater on operation, and a seat heater off operation.

17. The head unit of claim 15, wherein the radio frequency transceiver is configured to communicate according to at least one of a code division multiple access (CDMA), a global system for mobile communications (GSM), a long term evolution (LTE), or a worldwide interoperability for microwave access (WiMAX) radio transceiver.

18. The head unit of claim 15, wherein the boot-loader application further monitors an in-progress wireless data communication link set-up and transmits a ping message over the wireless data communication link.

19. The head unit of claim 15, wherein the remote operations event handling application transmits a head unit sleep state message via the radio frequency transceiver when the head unit prepares to enter a low power consumption operation mode.

* * * * *